United States Patent [19]

Stearns et al.

[11] Patent Number: 4,878,354

[45] Date of Patent: Nov. 7, 1989

[54] CHILLING ASSEMBLY LINE WORKPIECES BY CRYOGEN COUNTERFLOW

[75] Inventors: Thornton Stearns, Winchester; Russell W. Blanton, Acton, both of Mass.

[73] Assignee: Vacuum Barrier Corporation, Woburn, Mass.

[21] Appl. No.: 221,900

[22] Filed: Jul. 20, 1988

[51] Int. Cl.⁴ ............................................. F25D 13/06
[52] U.S. Cl. .......................................... 62/63; 62/373; 62/51.1
[58] Field of Search ........................ 62/63, 373, 514 R

[56] References Cited

U.S. PATENT DOCUMENTS

| | | | |
|---|---|---|---|
| 1,955,728 | 4/1934 | Allen et al. | 29/156.7 A |
| 1,980,156 | 11/1934 | Emrick | 29/149.5 R |
| 2,218,722 | 10/1940 | Ross | 29/156.7 R |
| 2,487,821 | 11/1949 | McCandless et al. | 62/63 |
| 3,025,680 | 3/1962 | De Brosse et al. | 62/514 R |
| 3,621,550 | 11/1971 | Colestock | 29/156.7 A |
| 3,972,202 | 8/1976 | Stearns | 62/514 R |
| 4,715,187 | 12/1987 | Stearns | 62/514 R |

Primary Examiner—Ronald C. Capossela

[57] ABSTRACT

Workpieces (e.g. valve seats, valve guides, or cylinder liners for an internal combustion engine) are chilled as they are supplied to a station on an assembly line, using a feeder/chiller that includes a passage to convey workpieces downwardly from a location at the top of the passage to an assembly line station. The chiller/feeder is fed cryogen from a reservoir of liquid cryogen. Because cryogen fluid (chilled nitrogen vapor) entering the passage is denser than air, downward flow of cryogen fluid must be restricted. For example, the passage includes a constriction below the position at which cryogen is fed to the passage. The constriction is configured and sized to allow workpieces to move through the constriction, yet the constriction is small enough to restrict the downward flow of cryogenic fluid when a workpiece is positioned in the constriction. Above the constriction, the cooling passage is large enough to allow sufficient clearance around workpieces to permit an upward flow of cryogenic fluid. The cryogenic fluid flows up the passage, counter to the movement of workpieces down the passage.

23 Claims, 3 Drawing Sheets

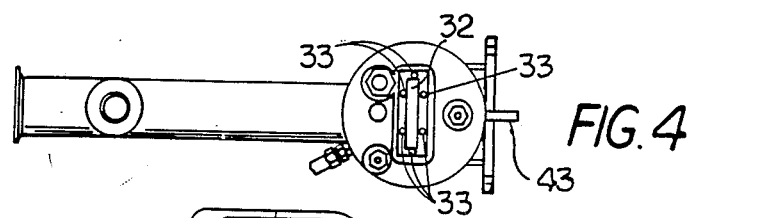
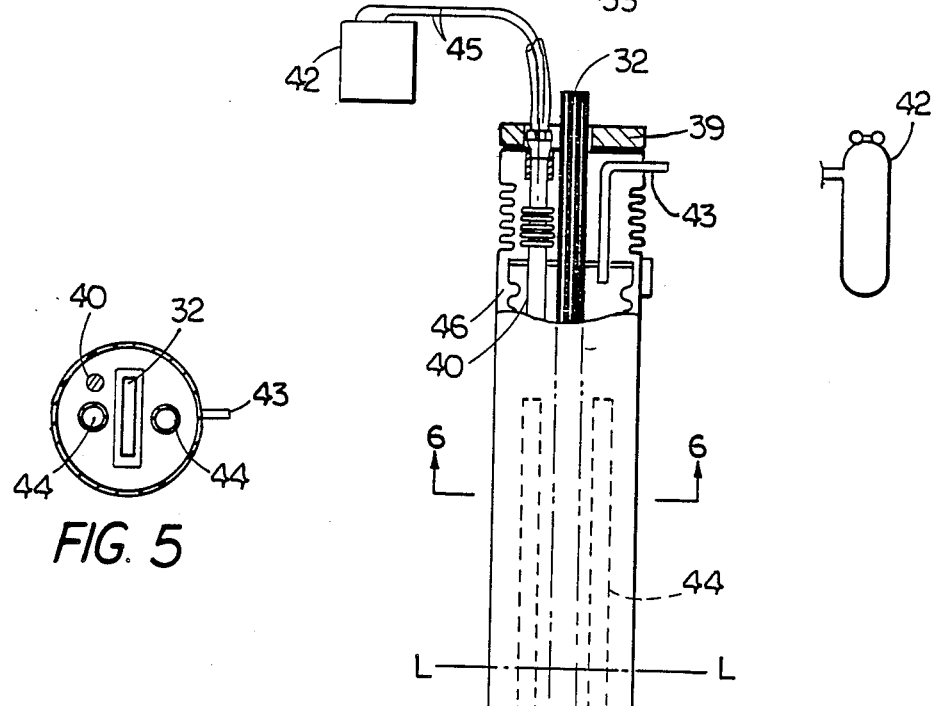
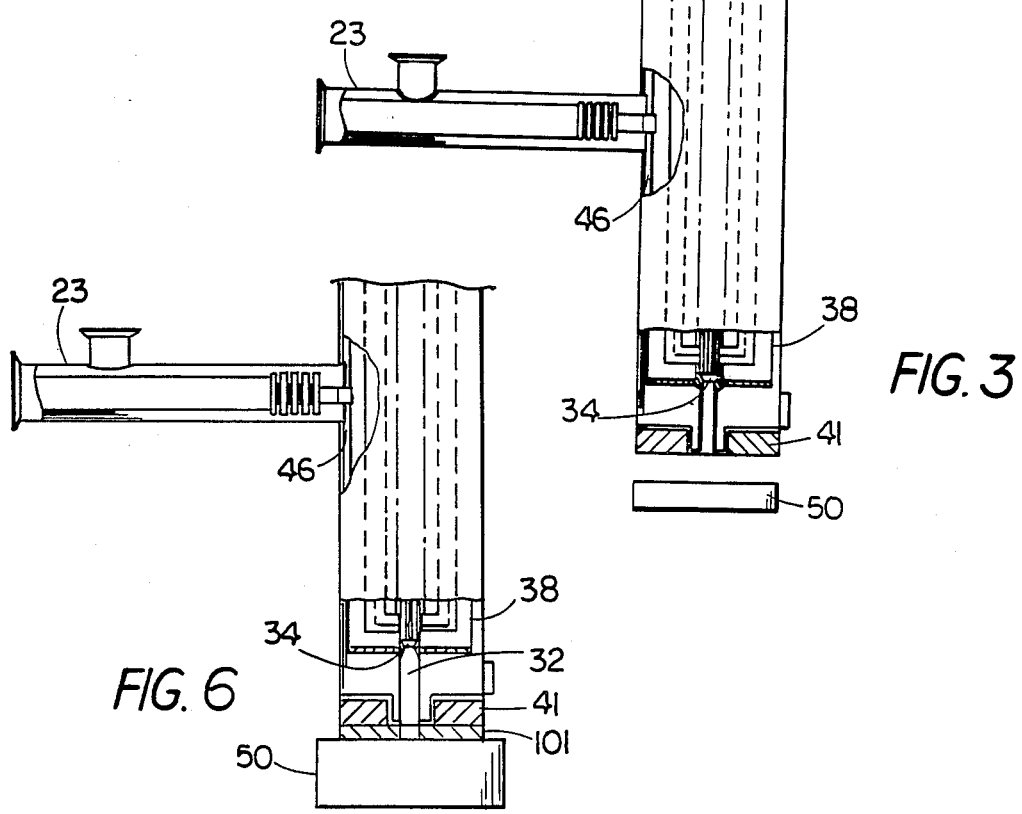

CHILLING ASSEMBLY LINE WORKPIECES BY CRYOGEN COUNTERFLOW

BACKGROUND OF THE INVENTION

This invention relates to chilling or cooling workpieces that are fed to an assembly line station, e.g., to shrink the workpieces so that they can be fit or pressed into a larger assembly.

It is useful to chill workpieces that are fed to an assembly line, particularly metal parts that must be shrunk so that they can be fit or pressed into a larger assembly. For example, valve seats, valve guides, or cylinder liners can be chilled so that they can be fit or pressed into the cylinder head or block of an internal combustion engine.

Various means of cooling or chilling workpieces have been proposed. For example, Ross U.S. Pat. No. 2,218,722 discloses workpiece-chilling device for use on an assembly line. The device has a chilling tray 107 (FIG. 11) which contains in compartment 108 (FIG. 12) a chilling agent, as for example, temperature controlling liquid air, and which contains in compartment 109 a light fuel oil.

Colestock U.S. Pat. No. 3,621,550 discloses a refrigeration chamber to chill valve seats 10 that are stored in a vertical magazine 12. The valve seats are chilled to below 0° C. by some unspecified mechanism in a refrigerator chamber. The chilled valve seats are transferred from the bottom of the magazine (by a pneumatic cylinder) to an assembly station.

Other prior art concerns apparatus for chilling individual parts, not necessarily in connection with an assembly line.

Emerich U.S. Pat. No. 1,980,156 discloses means for making an expansion fit using $CO_2$ to shrink bushings 17. A cylindrical head 18 receives $CO_2$ through flexible pipe 34.

Allen et al. U.S. Pat. No. 1,955,728 discloses a method and tool for inserting bushing 15 in, or removing it from, outer member 16, by spraying the bushing with $CO_2$ and a low-freezing point liquid. The tool is inserted into the bushing before spraying.

SUMMARY OF THE INVENTION

The invention features apparatus for rapidly chilling workpieces as they are delivered to an assembly line, using cryogenic fluid, particularly cold nitrogen vapor. The invention is suitable for very fast-moving assembly lines, and it enables the efficient use of cryogens such as liquid nitrogen. The flow of cryogen is controlled and stabilized, so that cryogen is not wasted and undesired cooling of external apparatus surfaces is avoided. Waste of cryogen during short assembly line stoppages is also minimized, while at the same time providing extremely effective cooling. Build-up of condensation and frost which could clog the apparatus and shut down the assembly line is avoided. Moreover, the cooling system is readily turned off and purged if a longer assembly-time shut-down is required.

Accordingly, one aspect of the invention generally features apparatus, and a method of using the apparatus, having a workpiece chiller with a passage to convey workpieces downwardly from a location at the top of the passage to an assembly line station. The passage receives a counter-flow of cryogen fluid (preferably substantially vapor). The apparatus also includes a reservoir to feed cryogen to, and maintain a desired liquid level in, the workpiece chiller. Because cryogen fluid entering the passage is denser than air, the chiller includes means for restricting the downward flow of cryogen fluid. One example of such a means for restricting downward flow is a constriction below the position at which the cryogen is fed to the conduit. The constriction is configured and sized to allow workpieces to move through the constriction, yet small enough to restrict the downward flow of cryogenic fluid when a workpiece is positioned in the constriction. Alternatively, the means for restricting downward cryogen fluid flow is a seal for sealing the bottom of the passage to the assembly line workstation. Above the means for restricting cryogen fluid flow, the passage is large enough to allow sufficient clearance around workpieces to permit an upward flow of cryogenic fluid. The cryogenic fluid (which is denser than the surrounding air) flows up the passage under pressure, counter to the movement of workpieces down the passage.

Preferred embodiments of the invention have the following features. The reservoir maintains a controlled liquid cryogen level in a bath surrounding the passage. A heating means is positioned to vaporize liquid cryogen to produce a desired fluid cryogen flow rate up the passage. Specifically, either an electrical resistance heater with a controlled current flow, or a controlled flow of warm vapor is used to vaporize liquid cryogen in a bath surrounding the passage. The passage is substantially vertical and is sized and configured to stack workpieces in the orientation desired for delivery to the workstation. Means to shut-off flow of cryogen in the conduit and a source of dry gas (e.g. nitrogen) are provided to purge the passage when the assembly line is stopped for long periods. The constriction extends along the passage a distance that is sufficiently long to cooperate with at least part of a workpiece to restrict downward cryogen fluid flow regardless of the workpiece position at the time of stoppage--e.g., if the workpiece is annular, the restriction is longer than the central hole in the workpiece. In that way, when assembly line is stopped for a short time, downward flow of cryogen remains restricted.

A second aspect of the invention features methods for chilling workpieces with the above-described apparatus. In addition to the use of the above-described preferred features, the preferred cryogen fluid is nitrogen; most preferably it is essentially nitrogen in vapor form. The workpieces move down the passage under gravitational force.

Other features and advantages of the invention will be apparent from the following description of the preferred embodiment.

DESCRIPTION OF THE PREFERRED EMBODIMENT

Brief Description of the Drawings

FIG. 3 is a side view, with parts in section and broken away, of the chiller/feeder of the apparatus shown in FIG. 1.

FIG. 4 is a top view of the chiller/feeder of FIG. 3.

FIG. 5 is a section along 6—6 of FIG. 3.

FIG. 6 is an alternate embodiment of chiller/feeder 30.

STRUCTURE

Figure 1:
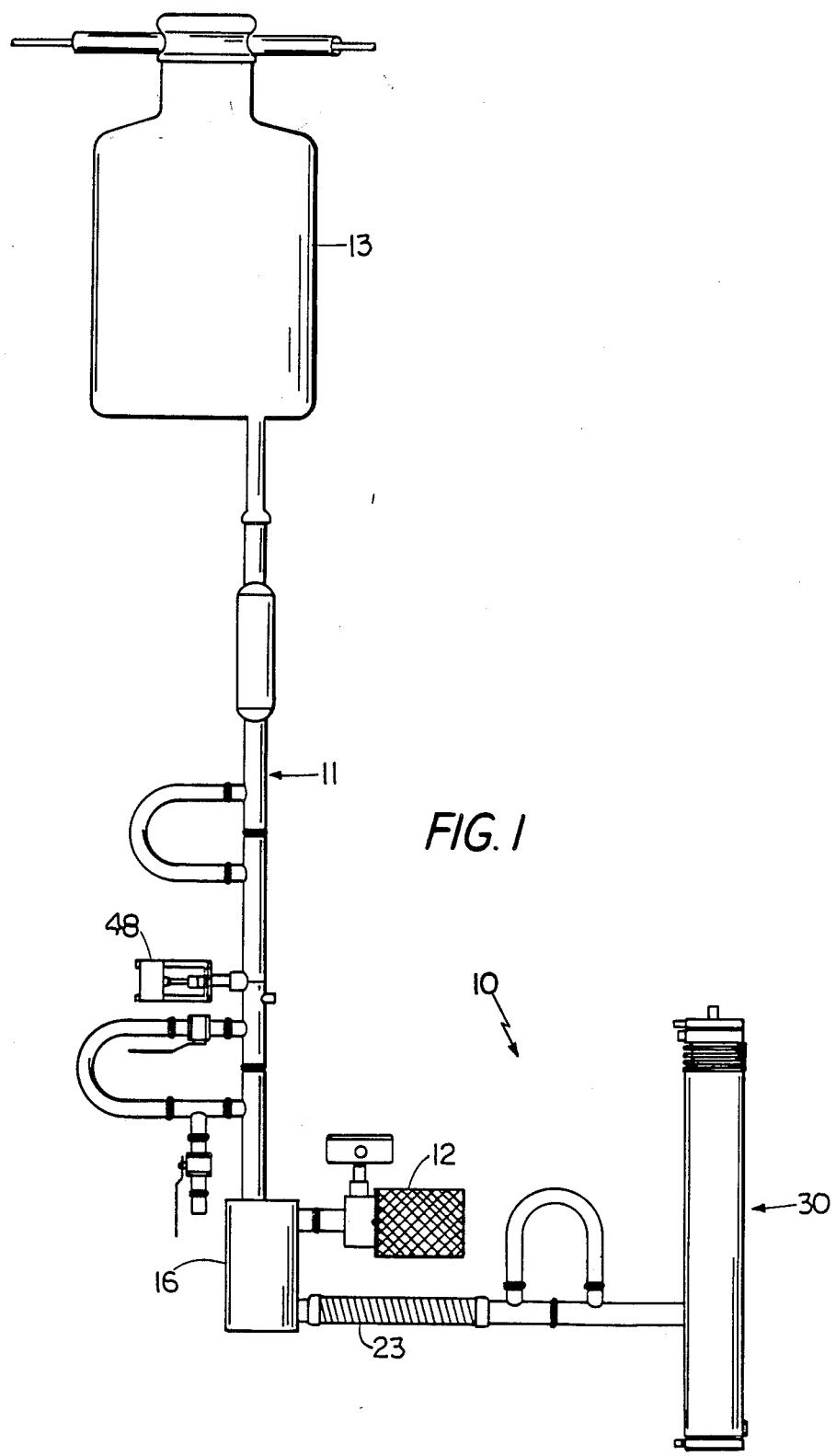
FIG. 1 is a side view of apparatus for chilling workpieces as they are delivered to an assembly line status.
Figure 2:
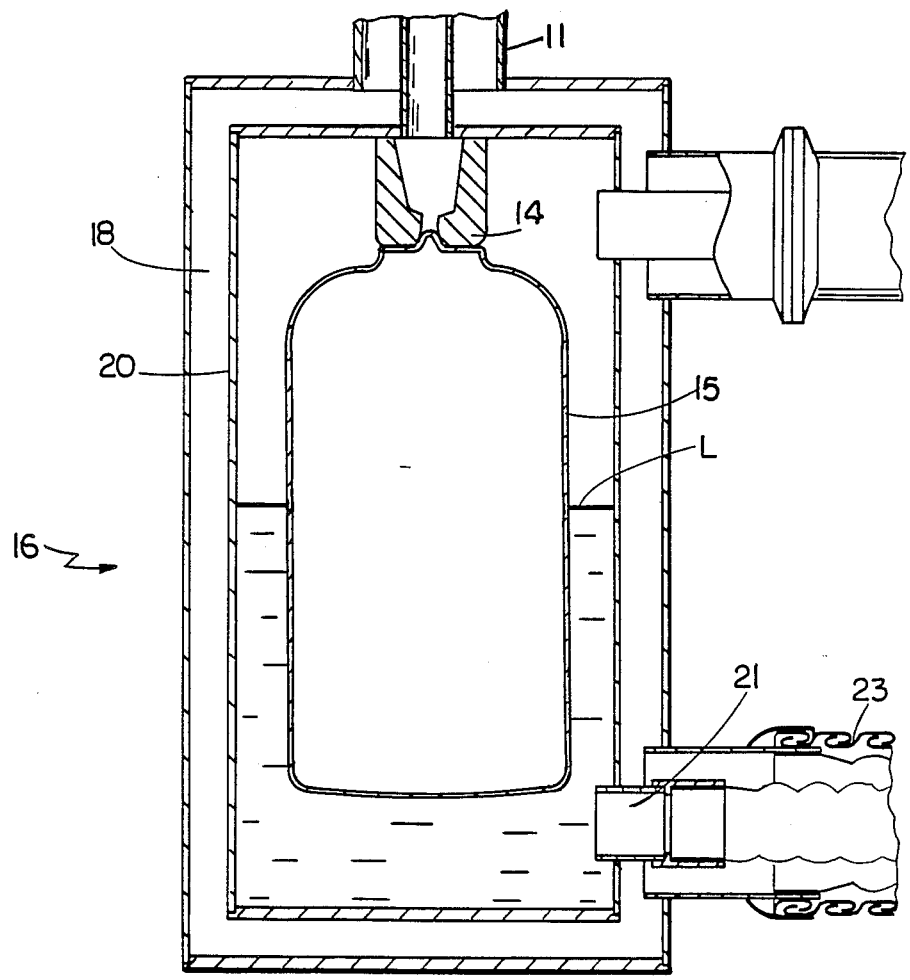
FIG. 2 is a side view, with parts in section and broken away, of the reservoir of the apparatus shown in FIG. 1.

FIGS. 1–5 describe one apparatus in particular for feeding valve seats to an assembly line for internal combustion engines. This description is not intended to limit the invention, which includes other apparatus and methods, particularly apparatus for chilling other workpieces such as valve guides or cylinder liners.

In the Figures, apparatus 10 feeds valve seats from a storage hopper (not shown) to an assembly line station 50, where the valve seats are fit or pressed into an internal combustion engine block by conventional methods which need not be described here. As the valve seats move through passage 32, they are chilled by a counterflow of cryogenic fluid (preferably cold nitrogen vapor).

Apparatus 10 includes a reservoir or float chamber 16, which is fed liquid nitrogen through triax line 11 from a phase separator 13 as described in U.S. Pat. No. 3,972,202. Reservoir 16 contains liquid nitrogen at atmospheric pressure (i.e. about −320° F.), and vents vapor through heated vent 12. Reservoir 16 (FIG. 2) includes an evacuated insulating space 18 surrounding internal container 20. A float 15 is positioned within container 20 at valve 14 to shut-off liquid cryogen flow from line 11 when a desired level L is reached in container 20.

Toward the bottom of container 20, multiple outlets (one shown) 21 feed liquid through conduits 23, to chiller/feeder 30. While only one conduit and chiller/feeder are illustrated, it is understood that the invention readily adapts to the use of multiple chiller/feeders fed by multiple conduits from a single reservoir. For example, in assembling an internal combustion engine, the chiller/feeders can be spaced apart to deliver a single valve seat to each of several cylinders in the same engine block (e.g. to each of three cylinders on one side of V-6 block). In that way multiple valve seats are inserted at each workstation to speed and simplify the assembly operation.

Reservoir 16 serves as a stable source of liquid nitrogen for chiller/feeder 30. Specifically, a constant desired liquid level L is maintained within chiller/feeder based on the float valve control in reservoir 16. Violent fluctuations of liquid level, which could affect the flow rate of chilled vapor up the passage in chiller/feeder 30, are avoided.

Chiller/feeder 30 (FIGS. 3–6) includes a central slot or passage 32 which is sized to accommodate valve seats edge-wise, but is too narrow to allow the valve seats to change their orientation as they slide down the passage. Passage 32 is wide enough, however, to accommodate a substantial counter-flow of cryogen fluid around the valve seats. Specifically, stainless steel guides 33 are positioned around the passage to maintain the workpiece in the center of the passage, and to allow even chilled nitrogen flow around the workpiece, avoiding uneven flow and uneven chilling. Guides 33 maintain a gap of from 1/16" to ⅛" between the valve seats and the wall of passage 32. The clearance between the valve seats and guides 33 is about 1/32".

Passage 32 is open at the bottom to feed valve seats to the assembly line station. Since cold nitrogen vapor is denser than air, it is important to prevent dense nitrogen fluid from pouring down the passage, creating a reverse chimney (i.e., creating a permanent forceful draft down the passage as a result of the significant cooling of the bottom of the passage). Such a draft would draw moisture into the passage, freezing and clogging it. Moreover, the draft would pour nitrogen fluid on the area surrounding the assembly line station, without cooling valve seats toward the top of the passage.

To control the above-described chimney effect, the passage includes a constriction 34 below the location where cryogen enters the passage. Constriction 34 is carefully sized and controlled to allow valve seats to pass with a small clearance (less than about 0.10" and preferably less than about 0.010"), which is effective to limit the downward flow of cryogen fluid.

Chiller/feeder 30 includes an external vacuum jacket 46 surrounding internal chamber 38. Conduit 23 feeds chamber 38 and fills it with liquid nitrogen to the level L determined by the float valve 14 in reservoir 16. Chiller/feeder 30 has two heat conductive (Al or Cu) metal discs 39 and 41 at its top and bottom, respectively, which can be heated by resistance heaters (not shown) to avoid condensation. An electrical resistance heater 40 (e.g. 250 Watts) is positioned for immersion in the liquid nitrogen in chamber 38. Wires 45 provide heater 40 with current controlled by a variable voltage controller 42.

Within chamber 38 are multiple (e.g. two vertical tubes 44 which are open at the top and which communicate at the bottom with passage 32 at a position close to, and above, constriction 34. A source of dry nitrogen gas 42 is connected to chiller/feeder 30 via inlet tube 43.

OPERATION

The operation of apparatus 10 begins when reservoir 16 is filled. Liquid nitrogen fills container 20 and valve 14 shuts off flow to reservoir 16. Liquid cryogen flows through conduit 23 to fill chamber 38 of chiller/feeder 30 to level L. Controller 42 is set to provide heater 40 in chamber 38 with a constant current selected to produce a desired nitrogen vapor flow rate. Cold nitrogen vapor enters the tops of tubes 44 and flows down the tubes.

Valve seats are loaded in the hopper, and they travel (edgewise) down passage 32. Variable voltage controller 42 is set to generate sufficient chilled $N_2$ flow to cool the valve seats at maximum assembly line running speed. However, the flow should not be so great as to waste liquid $N_2$ or to cause excessive frosting around the top of passage 32.

As cold nitrogen vapor enters passage 32, it tends to sink, but its downward flow is hindered by the close tolerance at constriction 34. Chilled nitrogen vapor is forced up passage 32, counter to the movement of valve seats. When the assembly line is moving, cooled valve seats pass the outlet of conduit 32 to the assembly line station. The configuration of passage 32 is such that the valve seats are delivered in the edge-on orientation which allows easier processing at the assembly line station. Rapid assembly line speeds, e.g. three or more valve seats/min, can be achieved.

The chiller is self-correcting to some extent. That is, a given setting is made on Variac controller 42, to achieve a desired temperature. If the workpieces are too warm, they will generate additional heat to produce a larger boil-off and nitrogen flow.

If the assembly line is stopped for short periods, the station prevents additional valve seats from moving through the passage outlet. Constriction 34 is longer than the space in the middle of the valve seats, so at all times when valve seat delivery is stopped, at least part of the constriction is adjacent to a valve seat to control downward cryogen flow. Nitrogen flow continues up the passage so the valve seats stay chilled and ready for immediate start-up, although in some cases the bottom valve seat, which is close to the external environment, is warmed and must be ejected. To ameliorate this effect and maintain even cooling of the various workpieces in the passage, the construction can be designed to permit a very small downward flow.

If the assembly line is stopped for longer periods, valve 48 in conduit 11 is closed, and dry, room temperature nitrogen vapor is introduced at inlet 43 and flowed through passage 32 to warm it without frost and condensation.

ASSEMBLY

The parts of apparatus 10 are generally stainless steel parts connected with bayonet joints or welded.

OTHER EMBODIMENTS

One particular alternative embodiment simplifies the device, taking advantage of the nitrogen purge apparatus to replace heater 40. Specifically, the dry $N_2$ purge is used to feed dry nitrogen gas continually into the liquid nitrogen in chamber 38. The gas will add heat to the liquid nitrogen, vaporizing a small portion of the liquid to create the desired chilled vapor flow. The chilled gas flow rate can be controlled by controlling the dry $N_2$ input flow rate.

Those skilled in the field will realize that other embodiments are within the following claims. Examples of other cryogens can be used. Other workpieces can be chilled. Other configurations of the workpiece feeder are possible. Rather than control downward $N_2$ vapor flow by a constriction, it is possible, when using a closed workpiece assembly line station, to seal the bottom of passage 32 to that station, by means of a cryogenic seal—e.g. teflon ring 101 in FIG. 6.

We claim:

1. Apparatus for chilling workpieces with cryogenic fluid and for delivering chilled workpieces to an assembly line station, said apparatus comprising:
    (a) a reservoir of liquid cryogen;
    (b) a chiller comprising a passage conveying the workpieces downwardly from a location at the top of the passage to the assembly line station, the chiller comprising means for restricting the downward flow of cryogenic fluid down the passage while simultaneously allowing passage of a workpiece therethrough, the passage above the means for restricting being sized and configured to allow sufficient clearance around workpieces to permit an upward flow of cryogenic fluid;
    (c) a conduit to feed cryogen fluid from the reservoir to the chiller, cryogen fluid being fed to the passage at a location between the top of the passage and the means for restricting;
    (whereby cryogenic fluid which is denser than the surrounding air flows from the reservoir to the passage, and under pressure, flows up the passage counter to movement of workpieces down the passage.

2. The apparatus of claim 1 in which the means for restricting comprises a constriction in the passage, the constriction being configured and sized to allow workpieces to move therethrough while being small enough to restrict flow of cryogenic fluid when a workpiece is positioned in the constriction.

3. The apparatus of claim 2 in which said constriction extends along the passage a distance selected to be long enough to cooperate with at least part of a workpiece to restrict downward cryogen fluid flow when workpiece movement down the passage is stopped, regardless of the position of workpieces in the passage when their movement stops.

4. The apparatus of claim 1 in which the means for restricting comprises a seal for sealing the bottom of the passage to the assembly-line workstation.

5. The apparatus of claim 1 in which the chiller comprises a liquid nitrogen bath positioned around the passage, and the liquid cryogen reservoir maintains a controlled level of liquid cryogen in the bath.

6. The apparatus of claim1 comprising a heating means positioned to vaporize liquid cryogen to produce a desired fluid cryogen flow rate up the passage.

7. The apparatus of claim 6 in which the liquid cryogen vaporizer comprises a electrical resistance heater positioned to contact liquid cryogen and a desired generate flow rate.

8. The apparatus of claim 6 in which the liquid cryogen vaporizer comprises a source of warm vapor positioned for delivery to liquid cryogen to generate a desired flow rate.

9. The apparatus of claim1 or claim 8 comprising a source of dry nitrogen gas to purge the passage, and a valve to shut off flow of cryogen in the conduit, whereby, when the assembly line is stopped, cryogen flow can be shut off and dry nitrogen gas can be used to purge the passage and prevent condensation and frost.

10. The apparatus of claim 1 in which the passage is substantially vertical.

11. The apparatus of claim 1 in which the passage is sized and configured to maintain workpieces moving through it in a desired orientation for delivery to the workstation.

12. A method for chilling workpieces with cryogenic fluid and for transferring cooled workpieces to an assembly line station, comprising:
    (a) providing a reservoir of liquid cryogen;
    (b) providing a chiller comprising a passage conveying the workpieces downwardly from a location at the top of the passage to the assembly line station, the chiller comprising means for restricting the downward flow of cryogenic fluid down the passage, the passage above the means for restricting being sized and configured to allow sufficient clearance around workpieces to permit an upward flow of cryogenic fluid;
    (c) providing a conduit to feed cryogen fluid from the reservoir to the chiller, cryogen fluid being fed to the passage at a location between the top of the passage and the means for restricting;
    (d) depositing workpieces in the passage, which move down the passage to the assembly line station;
    (e) restricting flow of cryogen fluid down the passage and thereby causing cryogenic fluid which is denser than air to flow, under pressure, up the passage counter to the movement of workpieces.

13. The method of claim12 in which the means for restricting comprises a constriction in the passage, the constriction being configured and sized to allow workpieces to move therethrough while being small enough to restrict flow of cryogenic fluid when a workpiece is positioned in the constriction.

14. The method of claim 12 in which the means for restricting comprises a seal for sealing the bottom of the passage to the assembly-line workstation.

15. The method of claim 12 in which the chiller comprises a bath surrounding the passage and the method comprises feeding liquid cryogen from the reservoir to the bath to maintain a controlled level of liquid cryogen in the bath.

16. The method of claim 15 comprising heating liquid cryogen to vaporize it and produce a desired fluid cryogen flow rate up the passage.

17. The method of claim 16 comprising providing a controlled electrical current through a resistance heater in contact with liquid cryogen to provide a controlled fluid cryogen flow rate.

18. The method of claim 16 comprising flowing warm vapor through liquid cryogen at a controlled rate to provide a controlled fluid cryogen flow rate.

19. The method of claim 12 in which the workpieces move down the passage under gravitational force.

20. The method of claim 19 in which the passage is substantially vertical.

21. The method of claim 12 in which the liquid cryogen is liquid nitrogen, and the fluid cryogen flowing up the passage is essentially nitrogen vapor.

22. The method of claim 12 in which the orientation of the workpieces delivered to the workstation is controlled by providing apparatus having a passage sized and configured to maintain the workpieces in the orientation as they move along the passage.

23. The method of claim 12 in which a source of dry nitrogen gas is provided to the passage, and when the assembly line is stopped, cryogen flow is shut off in the conduit and dry nitrogen is flowed through the passage to purge it and prevent condensation and frost.

* * * * *